J. HALL, Jr., & O. FLANIGAN.
Potato Digger.
No. 102,811. Patented May 10, 1870.
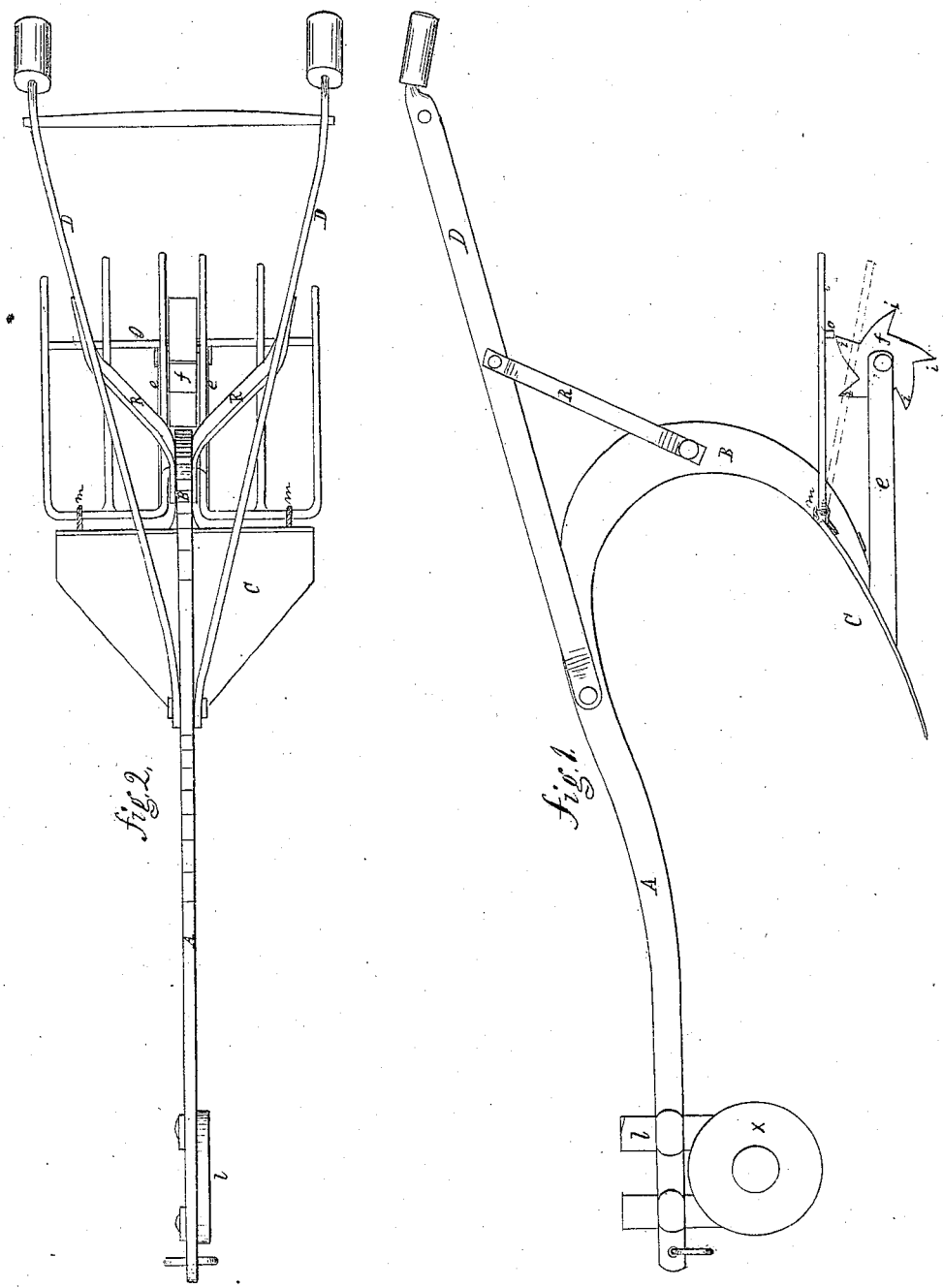
Inventors
John Hall Jr. & Owen Flanigan
By their attorney J. H. Johnston
attest Geo. H. Thomas
A. C. Johnston

United States Patent Office.

JOHN HALL, JR., AND OWEN FLANIGAN, OF TEMPERANCEVILLE, PENNSYLVANIA.

Letters Patent No. 102,811, dated May 10, 1870; antedated December 20, 1869.

IMPROVEMENT IN POTATO-DIGGERS.

The Schedule referred to in these Letters Patent and making part of the same.

*To all whom it may concern:*

Be it known that we, JOHN HALL, Jr., and OWEN FLANIGAN, both of Temperanceville, in the county of Allegheny and State of Pennsylvania, have invented a new and useful Improvement in Potato-Diggers; and we do hereby declare that the following is a full, clear, and exact description thereof, reference being had to the accompanying drawings and to the letters of reference marked thereon.

The nature of our invention consists in the combination and arrangement of a shovel-plow or digger, a separating rack, agitating wheel, and a graduating wheel, attached to the plow-beam.

To enable others skilled in the art to make and use our invention, we will proceed to describe its construction and operation.

In the accompanying drawings, which form part of our specification—

Figure 1 is a side elevation of our improvement in potato-diggers.

Figure 2 is a top view or plan of the same.

In the drawings—

A represents the beam, and B the standard, to which the plow or digger C is attached, to the back or top edge of which is pivoted, at m, a separator, consisting of a series of parallel rods attached to two cross-bars, n and o.

To the back of the plow or digger is attached a piece, e, in which is pivoted a wheel, f, the points i of which strike against the cross-bar o of the separator, and thereby causing it to rise and fall, for the purpose of imparting a jarring action to the separator.

To the front end of the beam A is attached a hanger, l, to which is pivoted the graduating wheel X, which may be raised or lowered with relation to the ground by adjusting the hanger l on the beam A, and thereby regulate the depth of the digging.

To the beam A are attached handles D, which are provided with braces R, for the purpose of giving stiffness to the handles.

As the construction of our improvement in potato-diggers will be readily understood from the foregoing description, and by reference to the accompanying drawings, we will therefore proceed to describe the operation, which is as follows:

The plow or digger C enters the hill or row, and divides it longitudinally, throwing the potatoes up, and the forward motion of the digger will cause the potatoes to pass back over the top edge of the digger, onto the separator, which will, by its jarring action, caused by the agitating wheel f, separate the loose earth from the potatoes, which will, when thus separated, fall off at the rear end of the separator onto the ground, from which they can be gathered with ease and facility.

Having thus described the nature, construction, and operation of our improvement,

What we claim as of our invention is—

The combination and arrangement of the plow or digger C, adjusting wheel X, separator and agitating wheel f, constructed, arranged, and operating with relation to each other as hereinbefore described and for the purpose set forth.

JOHN HALL, JR.
OWEN FLANIGAN.

Witnesses:
A. C. JOHNSTON,
JAS. G. THOMPSON.